(12) United States Patent
Schaefer et al.

(10) Patent No.: US 7,887,709 B2
(45) Date of Patent: Feb. 15, 2011

(54) SYSTEM AND METHOD FOR CATALYTIC TREATMENT OF CONTAMINATED GROUNDWATER OR SOIL

(75) Inventors: Charles E. Schaefer, Burlington Township, NJ (US); Charles W. Condee, Morrisville, PA (US)

(73) Assignee: Shaw Environment & Infrastructure, Inc., Lawrenceville, NJ (US)

( * ) Notice: Subject to any disclaimer, the term of this patent is extended or adjusted under 35 U.S.C. 154(b) by 1155 days.

(21) Appl. No.: 11/291,642

(22) Filed: Nov. 30, 2005

(65) Prior Publication Data

US 2007/0119786 A1  May 31, 2007

(51) Int. Cl.
C02F 1/70 (2006.01)
(52) U.S. Cl. .................. 210/757; 210/668; 210/763; 502/300
(58) Field of Classification Search .......... 210/743, 210/748, 757, 758, 259, 202, 206, 96.1, 763; 166/279; 502/10, 300; 422/127
See application file for complete search history.

(56) References Cited

U.S. PATENT DOCUMENTS

| 3,675,395 | A | * | 7/1972 | Baranowski | 96/159 |
|---|---|---|---|---|---|
| 4,182,919 | A | * | 1/1980 | Mabuchi et al. | 568/861 |
| 4,454,240 | A | * | 6/1984 | Ganguli | 502/26 |
| 4,637,990 | A | * | 1/1987 | Torobin | 502/10 |
| 4,827,071 | A | * | 5/1989 | Hazbun | 585/443 |
| 5,032,291 | A | | 7/1991 | Sublette | |
| 5,051,030 | A | | 9/1991 | Saha et al. | |
| 5,146,004 | A | * | 9/1992 | Morris et al. | 568/463 |
| 5,332,496 | A | | 7/1994 | Rasouli et al. | |
| 5,345,032 | A | | 9/1994 | Marks et al. | |
| 5,470,545 | A | | 11/1995 | Marks et al. | |
| 5,490,941 | A | | 2/1996 | Miyabe et al. | |
| 5,643,465 | A | | 7/1997 | Stalberg | |
| 5,645,374 | A | | 7/1997 | Lesage et al. | |
| 6,431,281 | B1 | * | 8/2002 | McNab et al. | 166/279 |
| 6,733,564 | B1 | * | 5/2004 | Sahu et al. | 75/353 |
| 2002/0033366 | A1 | * | 3/2002 | Pasquale et al. | 210/615 |
| 2003/0050487 | A1 | * | 3/2003 | Muller et al. | 549/529 |
| 2003/0173306 | A1 | * | 9/2003 | Cha et al. | 210/743 |
| 2004/0195189 | A1 | | 10/2004 | Kopinke et al. | |

FOREIGN PATENT DOCUMENTS

| JP | 11047559 A | * | 2/1999 |
|---|---|---|---|
| JP | 11286457 A | * | 10/1999 |

OTHER PUBLICATIONS

Gregory V. Lowery, hydrodehalogenation of 1-3-carbon halogenated Organis Compounds in Water Usiing a Palladium Catalyst and Hydrogen Gas, 1999, Enviromental Science and tech., volumn 33 pp. 1905-1910.*

* cited by examiner

*Primary Examiner*—Walter D Griffin
*Assistant Examiner*—Cameron J Allen
(74) *Attorney, Agent, or Firm*—RatnerPrestia

(57) ABSTRACT

A method for the treatment of a contaminated medium including the steps of introducing hydrogen into the contaminated medium, adding micron-sized metal catalyst particles to the contaminated medium, reacting the contaminated medium with the micron-sized metal catalyst and substantially retaining the catalyst particles in the contaminated medium. In another aspect, a system for the ex situ treatment of contaminated fluid including a vessel configured to receive the contaminated fluid, micron-sized metal catalyst particles located in the vessel, a hydrogen source positioned for delivering hydrogen to the contaminated fluid, and a membrane filter positioned to prevent the metal catalyst from eluting from the vessel.

61 Claims, 6 Drawing Sheets

SYSTEM AND METHOD FOR CATALYTIC TREATMENT OF CONTAMINATED GROUNDWATER OR SOIL

FIELD OF THE INVENTION

The invention relates to a method and a device for the decontamination of a medium containing organic contaminants. More specifically, the invention relates to a system and method for the catalytic treatment of contaminated waters or soil, including decontamination of groundwater containing chlorinated compounds, energetic compounds, nitrate and/or heavy metals using metal catalysts.

BACKGROUND OF THE INVENTION

The contamination of soil and groundwater by such compounds as chlorinated solvents, n-nitrosodimethylamine (NDMA), nitrates and other explosive compounds poses serious environmental problems. Present in wastewater as a result of a variety of industrial methods, these hazardous compounds pose health risks as they can readily leach into drinking water sources, in addition to polluting soil and groundwater.

Over the years, many methods have been developed in order to decontaminate polluted soil and wastewater, some involving in situ methods and others that involve ex situ methods. For example, zero valent iron (ZVI) and metal catalysts have been used to remove contaminants through reduction reactions. The use of iron for decontamination is inhibited as the iron corrodes. In some instances, catalytic methods require high operating temperatures and pressures, or are pH dependent, in order to effectuate decontamination.

In addition to catalytic reduction, various biological and abiotic methods for ex situ and in situ remediation of contaminated soil and groundwater have been developed. Methods including air stripping, photolysis using ultraviolet light, advanced oxidation, activated carbon adsorption and removal of contaminant precursors have also been used. However, many of these treatment methods are either not economical or result in undesirable secondary waste streams. Traditional treatment methods also often require days or even months to achieve the desired decontamination levels.

Therefore, there is still a need for an improved method and system for treating contaminated soil and waters.

SUMMARY OF THE INVENTION

In one aspect, the present invention includes a method for the treatment of a contaminated medium. Generally, the method includes the steps of introducing hydrogen into the contaminated medium, adding micron-sized metal catalyst particles to the contaminated medium, reacting the contaminated medium with catalyst particles, and substantially retaining the catalyst particles in the contaminated medium.

In another aspect, the invention includes a method for ex situ treatment of a contaminated fluid. The method according to this aspect includes the steps of introducing hydrogen into the contaminated fluid, intermingling the contaminated fluid with micron-sized metal catalyst particles in a vessel, and substantially preventing the catalyst particles from eluting from the vessel.

In yet another aspect of the invention, the invention includes a system for the ex situ treatment of a contaminated fluid. According to this aspect, the invention includes a vessel configured to receive the contaminated fluid and micron-sized metal catalyst particles, a hydrogen source positioned for delivering hydrogen to the contaminated fluid received in the vessel, and a membrane filter positioned to substantially prevent the metal catalyst from eluting from the vessel.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Generally, the present invention includes a method for the treatment of a contaminated medium that may be applied either in situ or ex situ, for treatment of such media as soil, groundwater, leachate and wash-down water. The method employs the reaction of a catalyst in the presence of dissolved hydrogen to reduce contaminants into nonhazardous products, in which removal of such contaminants as, for example, chlorinated ethenes and ethanes, n-nitrosodimethylamine, (NDMA), nitrates, trinitrotoluene (TNT), dinitrotoluenes (DNT), glycerol trinitrate (nitroglycerin), 2,4,6-trinitrophenylmethylnitramine (tetryl), perchlorate, heavy metals and/or cyclotrimethylenetrinitramine (RDX is effected. The catalytic treatment of the chlorinated solvents occurs via a catalytic hydrodehalogenation mechanism, where electron transfer occurs at the surface of the catalyst in the presence of dissolved hydrogen. The catalytic treatment of the NDMA and other nitro and nitroso compounds occurs via a similar catalytic hydrogenation method. These catalytic reactions occur at ambient temperatures and pressures.

The method according to the present invention is effective for converting harmful contaminants such as, for example, chlorinated ethenes including tetrachloroethene (PCE), trichloroethene (TCE) into ethane, and n-nitrosodimethylamine (NDMA) into ammonia and methane. The process is also effective in treating fluids contaminated with other explosive compounds such as nitrates, trinitrotoluene (TNT), dinitrotoluenes (DNT), glycerol trinitrate (nitroglycerin), 2,4,6-trinitrophenylmethylnitramine (tetryl), perchlorate, chlorinated ethanes and cyclotrimethylenetrinitramine (RDX).

Figure 1:
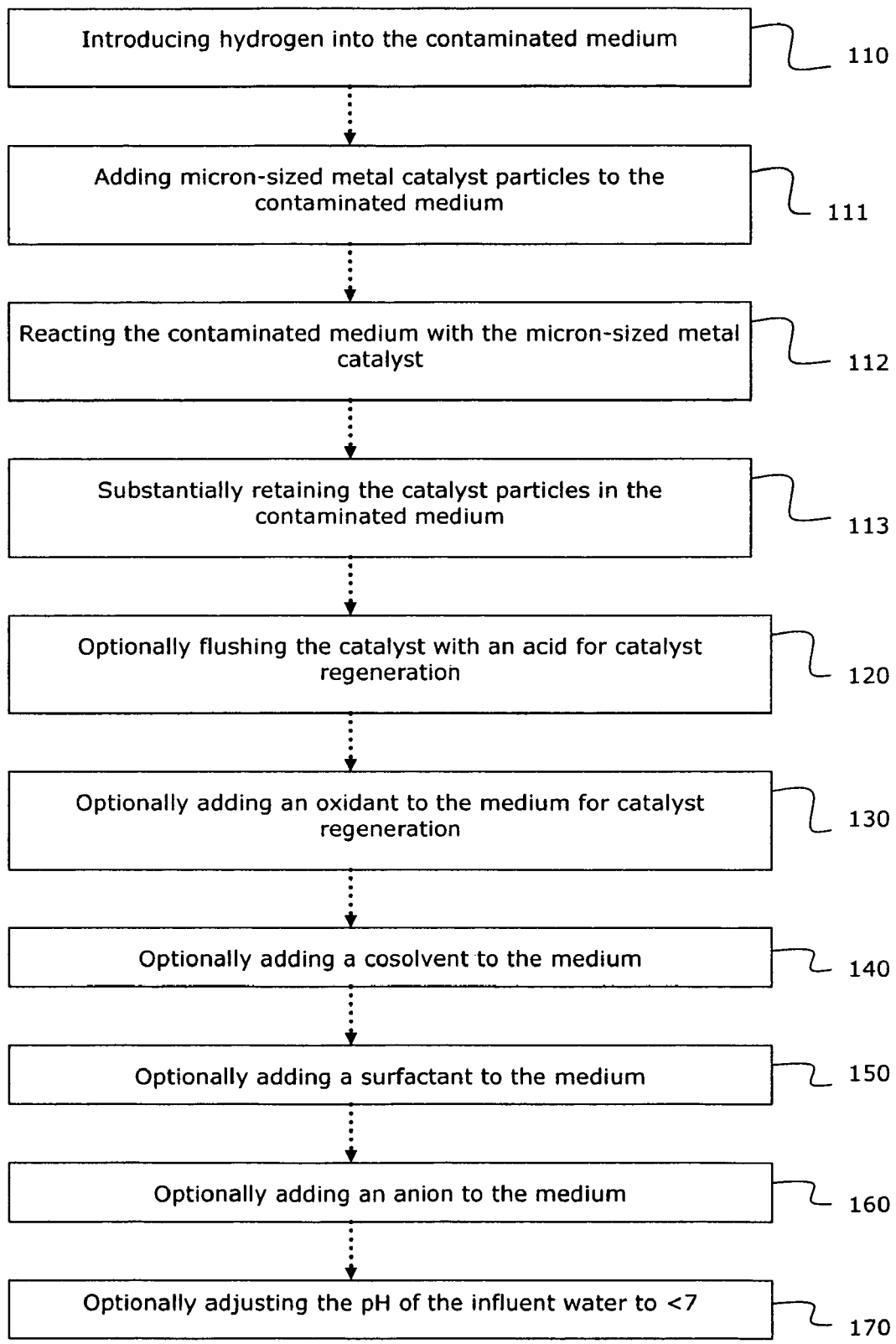
FIG. 1 is a flow diagram illustrating an exemplary method for treatment of a contaminated medium.

In an embodiment of the present invention, as shown in the flowchart of FIG. 1, the method for treating a contaminated medium includes the step 110 of introducing hydrogen into the contaminated medium. Hydrogen is included in order to facilitate the reaction between the catalyst and the contaminant, with the hydrogen acting as the reducing agent. The hydrogen introduced into the system is in the form of molecular hydrogen and may be introduced into the medium in any number of ways, including sparging, electrolysis, diffusion, membrane systems, chemical addition or any other means known in the art.

The method also includes the step 111 of adding micron-sized metal catalyst particles to the contaminated medium. While any metal catalyst that can react with hydrogen, particularly molecular hydrogen, can be used, Group VIII metal catalysts are preferred. Of these, nickel catalysts particles are more preferred, while nickel alumina catalyst particles are most preferred. Further, catalyst particles having an average nominal diameter in the range of about 100 µm to about 0.01 µm are preferred, catalyst particles having an average diameter in the range of about 0.1 µm to about 10 µm are more preferred, and catalyst particles having an average particle diameter of about 1 µm are most preferred.

With respect to catalyst size, it has been determined that average catalyst particle sizes below 0.1 µm require ultrafiltration, thereby significantly increasing the cost of the system. One type of exemplary nickel-alumina catalyst that has been used in the process is a nickel catalyst powder (65% by wt) on alumina and silicate support (Aldrich #208779, Milwaukee, Wis.) ("Aldrich nickel").

In the case of an in situ process for treating a contaminated medium, the catalyst particles may be added to the medium through slurry injection, hydrofracturing, or by addition of the catalyst particles to a permeable reactive barrier which is placed in the medium (e.g. a trench). In an ex situ process, the catalyst particles are directly added to the vessel in which the reaction of the catalyst with the contaminated medium occurs.

Still further, the method includes the step 112 of reacting the contaminated medium with the micron-sized metal catalyst particles at ambient conditions. Micron-sized metal catalyst particles provide increased surface areas over larger sized particles, thus increasing the rate of decontamination and the effectiveness of the catalyst.

Finally, the method includes the step 113 of substantially retaining the catalyst particles in the contaminated medium. For an ex situ method according to an aspect of the invention, this may be achieved by using a membrane filter. The types of membrane filters may vary depending on the required capacity of decontaminated medium to be processed. Examples of membrane filters that can be utilized in the process are membrane filters made by Zenon Environmental, Inc. or Koch Membranes, Inc., for example Koch's ABCOR®—Tubular ULTRA-CORO® 7 Plus membrane filter. For an in situ method, according to another aspect of the invention, retention of the catalyst particles may be achieved by natural filtration through the porous medium itself, or retention of the catalyst may be effected by a permeable reactive barrier.

Generally, the method for treating a contaminated medium may be accomplished by performing the above noted steps. However, additional steps may also be optionally included to enhance or improve performance. Optionally, the step 120 of flushing the catalyst with an acid for catalyst regeneration may be included. In this case, the flushing step 120 may be followed by a step (not shown) of recovering and/or neutralizing the acid after catalyst regeneration. Alternatively, or in addition to the acid addition step, the catalyst may also be regenerated by inclusion of the step 130 of adding an oxidant to the medium.

Other steps that may be utilized to improve performance of the method for treating contaminated waste include the step 130 of adding a cosolvent to the contaminated medium. The cosolvent is added to increase solubility of the contaminants, in which the cosolvent may include an alcohol or acetonitrile. Optionally, the step 150 of adding a surfactant to the medium may also be included. The step 160 of adding an anion, such as a chloride or a nitrate, may also be included for increasing overall contaminant degradation kinetics and for inhibiting catalyst deactivation. Another optional step 170 may also include adding acid to the vessel influent stream upgradient of the vessel to reduce the pH of the contaminated fluid to <7, thereby limiting carbonate precipitation. In one aspect, an ex situ method may also include the step (not shown) of pre-filtering the contaminated medium in order to remove soil, bacteria or other microorganisms, or other entrained solids that could foul or clog the membrane system. Such a method may be performed by a sand-packed filter or an activated carbon filter. It is also contemplated that combinations of these optional steps may also be used.

Figure 2:
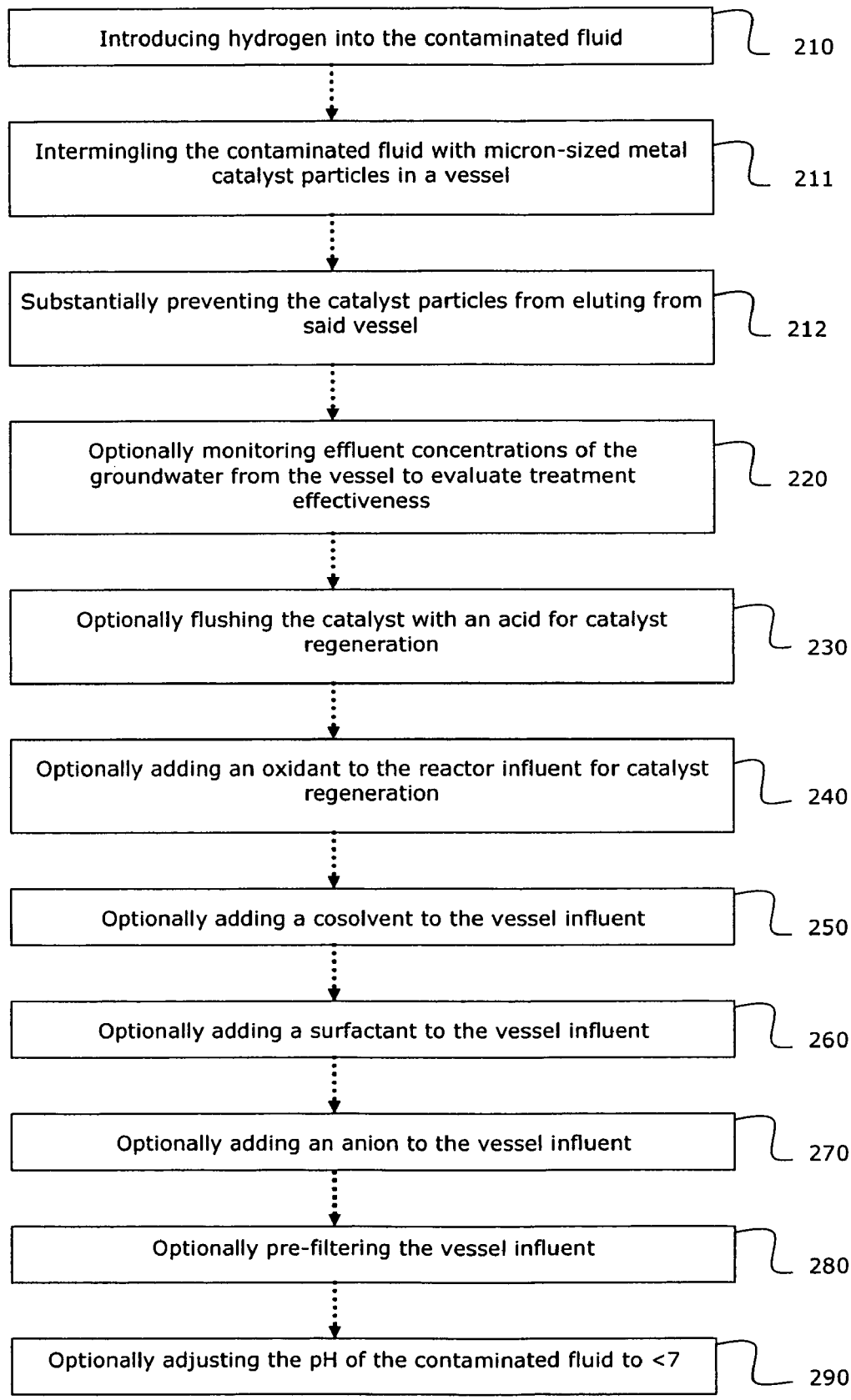
FIG. 2 is a flow diagram illustrating an exemplary method for ex situ treatment of a contaminated fluid.

Referring to FIG. 2, in an aspect of the invention generally relating to a method for ex situ treatment of a contaminated medium where the contaminated medium is a contaminated fluid such as groundwater, leachate or wash down-water, the method comprises the step 210 of introducing hydrogen into the contaminated fluid, step 211 of intermingling the contaminated fluid with micron-sized metal catalyst particles in a vessel, and step 212 of substantially preventing the catalyst particles from eluting from the vessel in the reactor effluent. The method may also, optionally, include the step 220 of monitoring effluent concentrations of contaminants in the treated groundwater effluent to evaluate treatment effectiveness. The process may be performed in a vessel such as a batch reactor or a continuously operating reactor, which may be operated at ambient conditions.

With respect to intermingling step 211, the micron-sized catalyst may be a Group VIII metal catalyst, preferably a nickel metal catalyst and more preferably a nickel alumina catalyst. The micron-sized catalyst particles also preferably have an average nominal diameter in the range of about 100 µm to about 0.01 µm, more preferably an average diameter in the range of about 0.1 µm to about 10 µm, and most preferably an average nominal diameter of about 1 µm.

The hydrogen necessary for the reduction reaction between the contaminants in the fluid and the metal catalyst particles of intermingling step 211 may be introduced in step 210 upstream of the vessel by a conventional gas-liquid membrane system. Alternatively, hydrogen may be introduced via an internal hydrogen source (not shown), for example through diffusion from pressurized tubing, such as silicone tubing, after which the hydrogen then dissolves into the contaminated fluid contained in the vessel.

With respect to step 212 of substantially preventing the catalyst particles from eluting from the vessel, this step is necessary to prevent catalyst particles from being carried out of the vessel in the treated, decontaminated fluid effluent of the vessel, both to prevent the loss of the catalyst from the reactor for economical reasons and to avoid contaminating the treated fluid with the metal catalyst for environmental reasons. As the particles are micron-sized, membrane technology can be utilized to filter the catalyst particles out of the treated fluid. Filter membranes can be located either downstream and external of the vessel or internal to the vessel. The size and type of membrane necessary to perform the filtration is a function of the size of the total flow of contaminated water to be treated, as well as the catalyst loading in the water.

In addition to the steps noted above, the embodiment of the method as illustrated in FIG. 2 also includes several optional steps that while not necessary to the method, enhance the performance of the method. The flushing of the catalyst of step 230 may optionally be included in order to regenerate the catalyst as the catalyst becomes exhausted over time. If acid is added, it is also advantageous to include an additional step (not shown) for recovering and neutralizing the acid. The step 240 of adding an oxidant to the fluid to be treated may optionally be added as an additional or as an alternative way of regenerating the catalyst. Other steps may include step 250 of adding a cosolvent, such as alcohol or acetonitrile, to the fluid entering the vessel or step 260 of adding a surfactant to the vessel influent. In addition, the step 270 of adding an anion, such as a chloride or a nitrate, may also, optionally, be included. The step 280 of pre-filtering the fluid before the fluid enters the reactor may also be performed. While a sand-packed pre-filter or an activated carbon filter may be used as well, the step 280 of pre-filtering is included to remove soil particles, microorganisms and other entrained solids to minimize fouling of the catalyst particles. Yet another optional step 290 may also include the step of adding acid to the vessel influent stream upgradient of the vessel to reduce the pH of the contaminated fluid to <7, thereby limiting carbonate precipitation.

Figure 3:
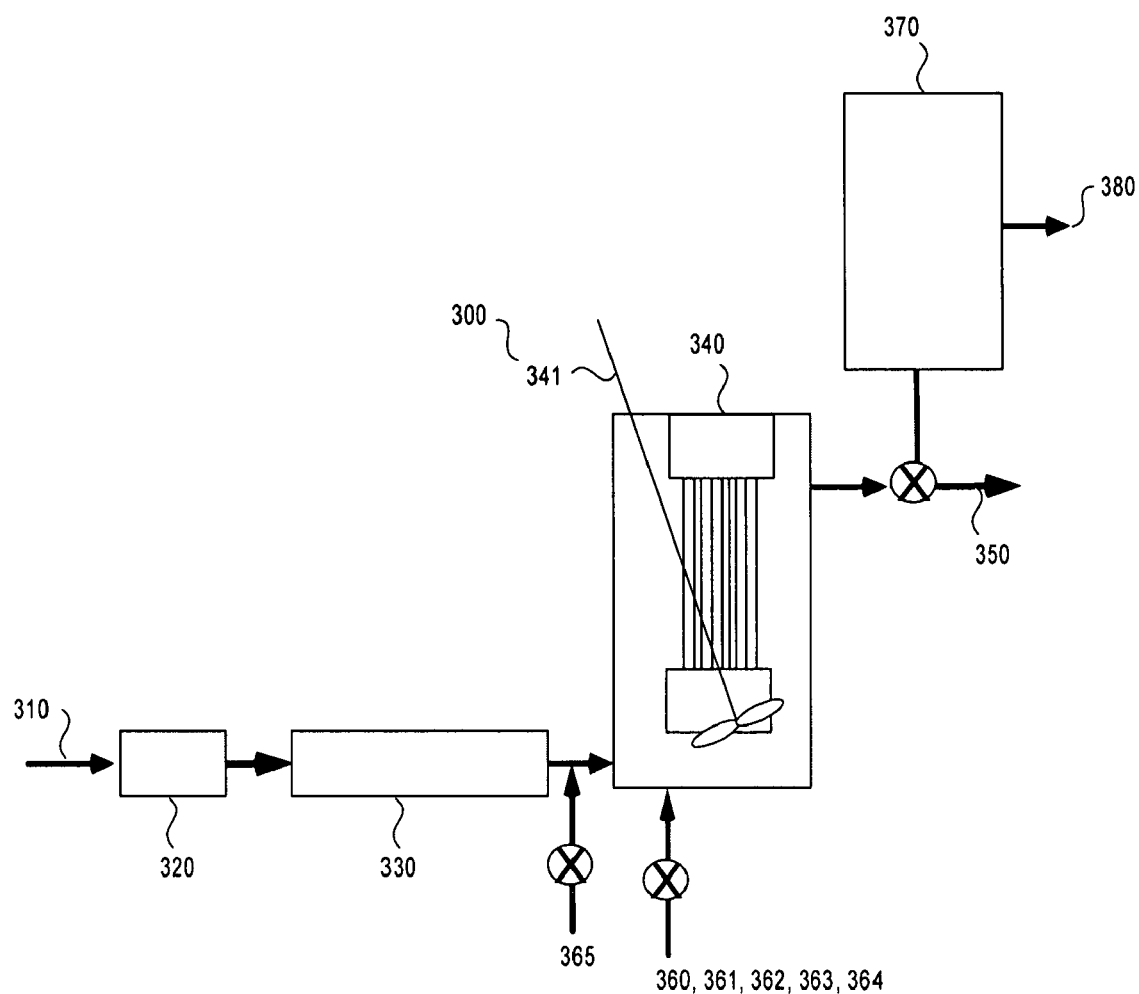
FIG. 3 is a block diagram of an exemplary embodiment of an ex situ system for treating a contaminated fluid.

Referring generally to FIG. 3, the method for treating the contaminated medium can be carried out ex situ inside of a vessel, which may be operated at ambient conditions, to treat a contaminated fluid such as groundwater, leachate, washdown water or other aqueous stream. FIG. 3 is a block diagram of an embodiment of an ex situ system 300 for decontaminating a contaminated fluid. The system according to this embodiment includes a vessel 340 configured to receive the contaminated fluid, which is introduced to the vessel via influent line 310. The system 300, also includes micron-sized metal catalyst particles (not shown) located inside the vessel for treating the contaminated fluid. The vessel 340 includes a mixing device 341 to keep the catalyst particles mixed in the contaminated fluid.

The system 300 further includes a hydrogen source 330, illustrated schematically upstream of the vessel 340, positioned to deliver hydrogen to the contaminated fluid using a conventional membrane system. Alternatively, a hydrogen source may also be located inside the vessel in which the internal hydrogen source (not shown) comprises pressurized tubing located inside the vessel. In this alternative embodiment, hydrogen is diffused through the tubing and dissolved into the fluid in the vessel 340. It is also contemplated that hydrogen may also be delivered into the contaminated fluid by chemical additives, electrolysis, or other methods as is known in the art.

The catalyst particles used for treating the contaminated fluid can include any metal capable of performing catalytic reduction in the presence of hydrogen, specifically molecular hydrogen, to reduce the contaminants into less harmful compounds. For example, it is desirable to decontaminate fluid that may include contaminants such as, for example, chlorinated ethenes and ethanes, n-nitrosodimethylamine, (NDMA), nitrates, trinitrotoluene (TNT), dinitrotoluenes (DNT), glycerol trinitrate (nitroglycerin), 2,4,6-trinitrophenylmethylnitramine (tetryl), perchlorate, heavy metals and cyclotrimethylenetrinitramine (RDX) or mixtures thereof. In one aspect of the current invention, the system may include any Group VIII metal as the catalyst. Preferably, the metal catalyst particles are nickel, and more preferably, the metal catalyst particles are nickel on alumina, silica, or diatomaceous earth.

It has also been found that size of the catalyst particles utilized in the ex situ system also have an impact on catalyst reactivity. The size of the catalyst particle, in particular the diameter of the catalyst particle, and therefore its available surface area, has a direct relationship on catalyst performance. Average catalyst nominal diameters in the range of about 0.01 µm to about 100 µm are preferred. More preferably, average catalyst diameters are in the range of about 0.1 µm to 10 µm. Most preferably, the average diameter of the catalyst particles is about 1 µm.

In an aspect of the invention comprising an ex situ system, the system also includes a membrane filter to prevent the metal catalyst from being carried away with the treated fluid. The filter membrane can be located either downstream and external of the vessel or alternatively, as shown in FIG. 3, the filter membrane can be located inside the vessel.

As shown in the embodiment illustrated in FIG. 3, the system 300 includes an internal membrane filter positioned to prevent the metal catalyst particles from eluting from the vessel 340. In this embodiment, contaminated water is introduced into vessel 340 via influent line 310, which may optionally be pre-treated as discussed below. The contaminated influent is then mixed with the metal catalyst which reacts with hydrogen dissolved in the contaminated fluid, as discussed above.

After mixing for a sufficient time to allow the metal catalyst, hydrogen and contaminated water to react with one another, filtration is performed using a submerged filter membrane. The membrane filter of this embodiment includes a bundle of tube-shaped filter membranes positioned between a cap on one side for sealing the membranes, and a cap on the other side having an outlet for removing treated effluent from the inside of the filter membranes. In this case, the fluid filtration is performed from the outside to the inside of the tubular membrane where the filtering layer is located on the outside of the tubular membrane. The membrane filter operates by drawing the fluid through the pores of the membrane with the use of a slight vacuum applied on the inside of the membrane. The treated, decontaminated fluid, or permeate, that is also substantially free of the metal catalyst, is then discharged from the inside of the membrane filter via the effluent line. The contaminants and metal catalyst are substantially or completely retained in the vessel as retentate. Exemplary membrane filters that can be used in the embodiment shown in FIG. 3 may be commercial membrane filters provided by manufacturers such as Zenon Environmental, Inc. or Koch Membrane Systems, Inc., and sizing of the particular membrane filter varies depending on the influent flow rate of the contaminated fluid to be treated.

In alternative embodiments where an external membrane filter is used, typical membranes could also include commercial tubular membranes of the type manufactured by Zenon Environmental, Inc. or Koch Membrane Systems, Inc. The type and size of the particular membrane filter used will vary depending on the operating conditions of the system, including the influent flow rate, catalyst used or contaminants to be treated.

Further, other optional features can be included in system 300 to enhance treatment effectiveness and efficiency. For example, the contaminated influent water may be optionally pre-filtered upstream of vessel 340 using a sand-pack prefilter, activated carbon filter, or other pre-filter, illustrated generally by reference numeral 320, that is configured to remove soil particles, microorganisms, and other entrained solids. The system 300 may also optionally include a catalyst regeneration system comprising an acid 360 or an oxidant feed 361. In an embodiment where the regeneration is carried out by an acid 360, the system further includes a neutralization tank 370 configured to collect and neutralize the acid after the catalyst has been regenerated. In other embodiments, the system includes sources of further additives to improve system performance. For instance, one embodiment may include a surfactant source 362 or a cosolvent source 363 configured to add a surfactant or a cosolvent, such as an alcohol or acetonitrile, to the fluid to increase the solubility of the contaminants. In another embodiment, an anion source 364 is provided that is configured to add an anion, such as a chloride or a nitrate, to the fluid to increase overall contaminant degradation kinetics and to inhibit catalyst deactivation. Acid may also be added to the influent stream upgradient of the reactor via acid source 365 to decrease the pH to <7, thereby limiting carbonate precipitation. It is also contemplated that combinations of these optional features may also be used.

The present invention generally and according to each of the embodiments described above provides a method and system for treating a contaminated medium that effectively degrades contaminants such as chlorinated solvents, as well as energetic compounds, nitrate, and heavy metals. The exemplary methods and systems disclosed herein performs such treatment without generating undesirable secondary waste streams and provides an alternative method and system to those systems that require more expensive catalysts or more expensive equipment to operate. A further advantage of the disclosed methods and systems over other known methods and systems include faster kinetics and resistance to corrosion.

EXAMPLES

Exemplary features of the invention are illustrated in the following examples. The tests were conducted using bench scale reactors. In each of the tests conducted, nickel catalyst dosage within the bench scale reactor was kept low in order to evaluate reactor kinetics at relatively low flow rates, thereby limiting the volume of influent water that needed to be prepared in the laboratory. Nickel catalyst dosage of up to 200 grams (per 3 liters of reactor volume) used in field-reactor design is contemplated, which would thereby increase the observed reactor kinetics and decreasing the estimated residence time by greater than a factor of 10.

Example 1

Figure 4:
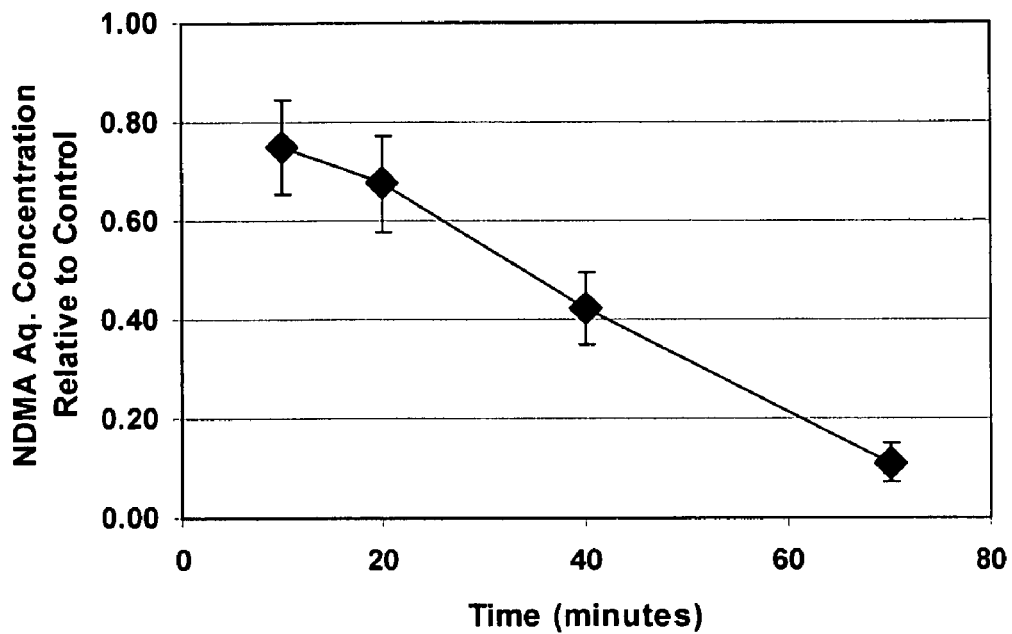
FIG. 4 is a graph of the results of NDMA degradation in the presence of nickel catalyst particles plotted relative to control in accordance with Example 1.
Figure 5:
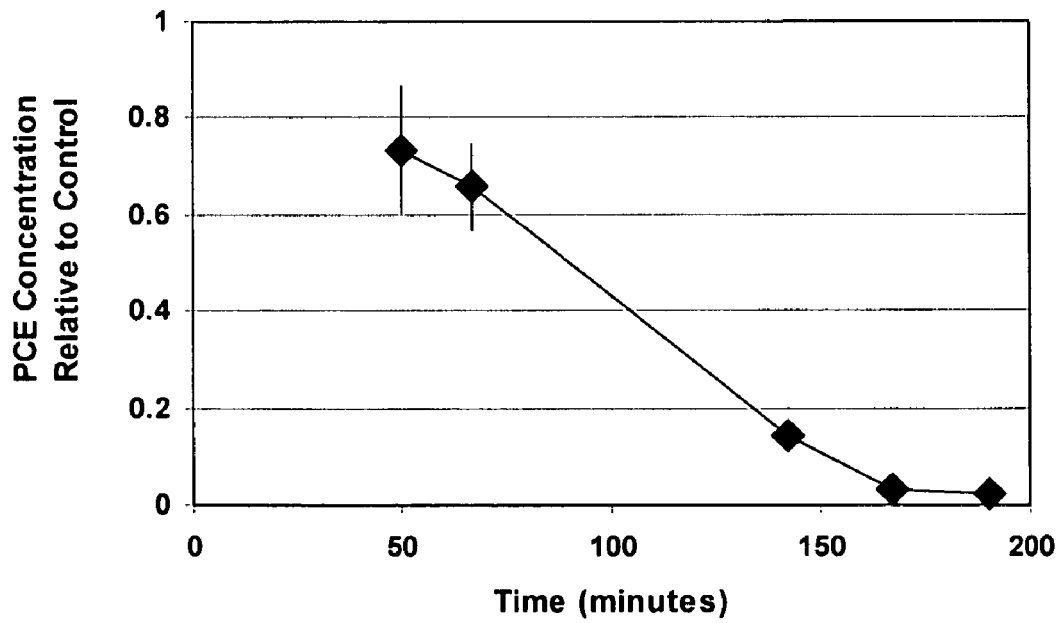
FIG. 5 is a graph of the results of PCE degradation in the presence of nickel catalyst particles plotted relative to control in accordance with Example 1.

Tests were conducted to evaluate the use of nickel catalysts for the treatment of chlorinated ethenes, specifically PCE and NDMA. Results of laboratory batch experiments using an aqueous solution containing an initial loading of 50 mg/L NDMA, 1 mg/L tetrachloroethene (PCE), and 5 mg/L nitrate are shown in FIGS. 4 (NDMA) and 5 (PCE). About 0.1 grams of micron-sized nickel alumina catalyst particles, having an average diameter of <60 µm, and dissolved hydrogen were used to treat the target contaminants. The tests were conducted at ambient conditions. Results are plotted relative to controls that contained no nickel catalyst. These data show that nickel catalysts are able to rapidly degrade aqueous mixtures of chlorinated ethenes and NDMA. Similar experiments performed using natural groundwater were also conducted which also evidenced rapid degradation of PCE, TCE, and NDMA.

Example 2

Tests were conducted using a bench scale reactor for treating an artificial groundwater containing TCE, sulfate, nitrate, carbonate and manganese. The tests were carried out in a 3-liter glass vessel, using 10 grams of micron-sized nickel alumina catalyst having an average particle diameter of <60 µm and an influent dissolved oxygen content of 8 mg/L. Artificial groundwater containing target contaminants was pumped into the reactor, mixed with the catalyst particles and dissolved hydrogen, and withdrawn through the membrane filter, located in the center of the vessel. The dissolved hydrogen in an amount of was delivered to the groundwater via silicone tubing that was spiraled around the inside of the vessel and pressurized to approximately 15 psi of hydrogen gas. The reactor was operated at ambient conditions. Use of the membrane filter was required to keep the nickel catalyst inside the reactor (parallel tests were performed to verify that no measurable dissolved or colloidal nickel was eluting from the reactor). The membrane filter required periodic (every few days) low-pressure backwashing to remove attached catalyst particles. Nickel particles were kept in solution using a magnetic stir bar. Effluent water concentrations were monitored as a function of time to evaluate treatment effectiveness. TCE was analyzed using a gas chromatograph equipped with an electron capture detector.

Figure 6:
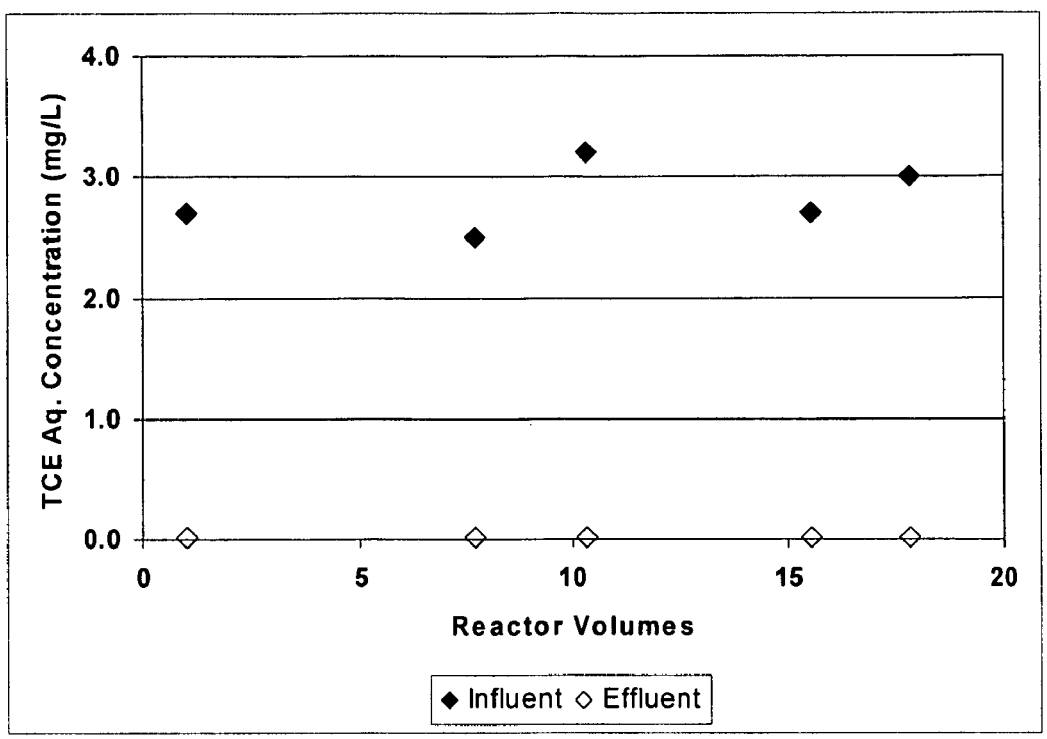
FIG. 6 is a graph illustrating the reactor influent and effluent concentrations of an artificial groundwater containing TCE for each of the reactor volumes tested in accordance with Example 2.

As shown in FIG. 6, for the reactor influent and effluent concentrations for each of the reactor volumes tested, results show the effective treatment of TCE.

Example 3

Figure 7:
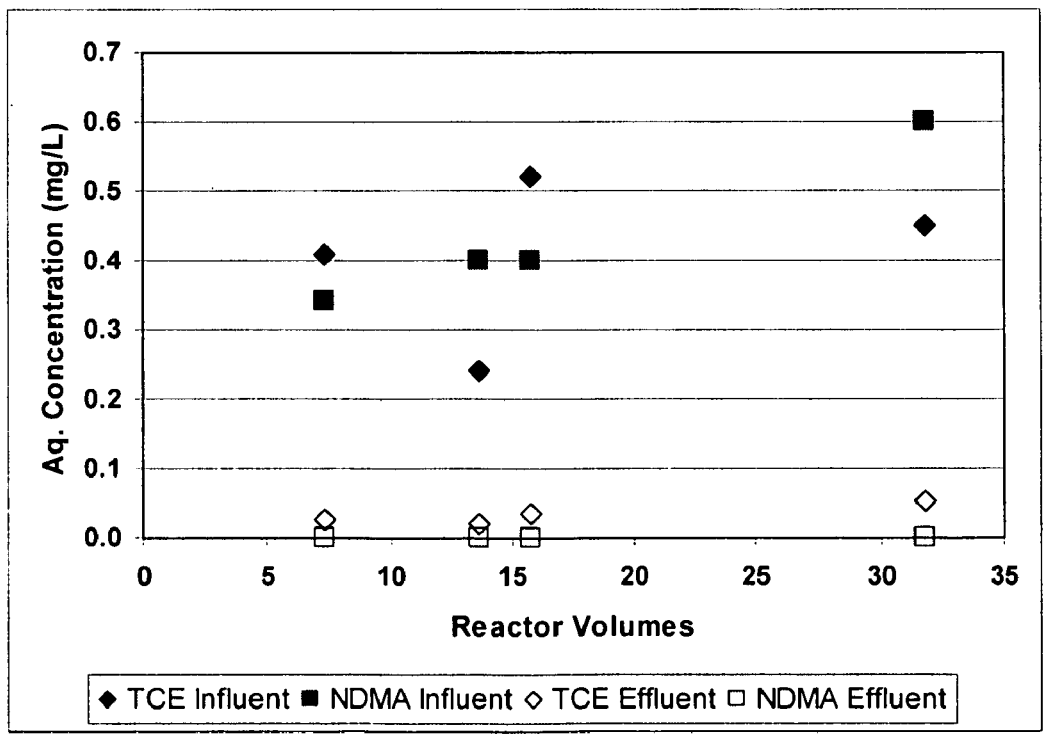
FIG. 7 is a graph illustrating the reactor influent and effluent concentrations of an artificial groundwater containing TCE and NDMA for each of the reactor volumes tested in accordance with Example 3.

Tests were also conducted utilizing the same parameters as Example 2, except that the artificial groundwater contained TCE, NDMA, sulfate, nitrate, carbonate and manganese. As shown in FIG. 7, for the reactor influent and effluent concentrations for each of the reactor volumes tested, results show the effective treatment of TCE and NDMA. The NDMA effluent concentrations were below the detection limit of approximately 60 µg/L. Subsequent testing showed that treatment of NDMA to below 1 ng/L is attainable.

Example 4

Figure 8:
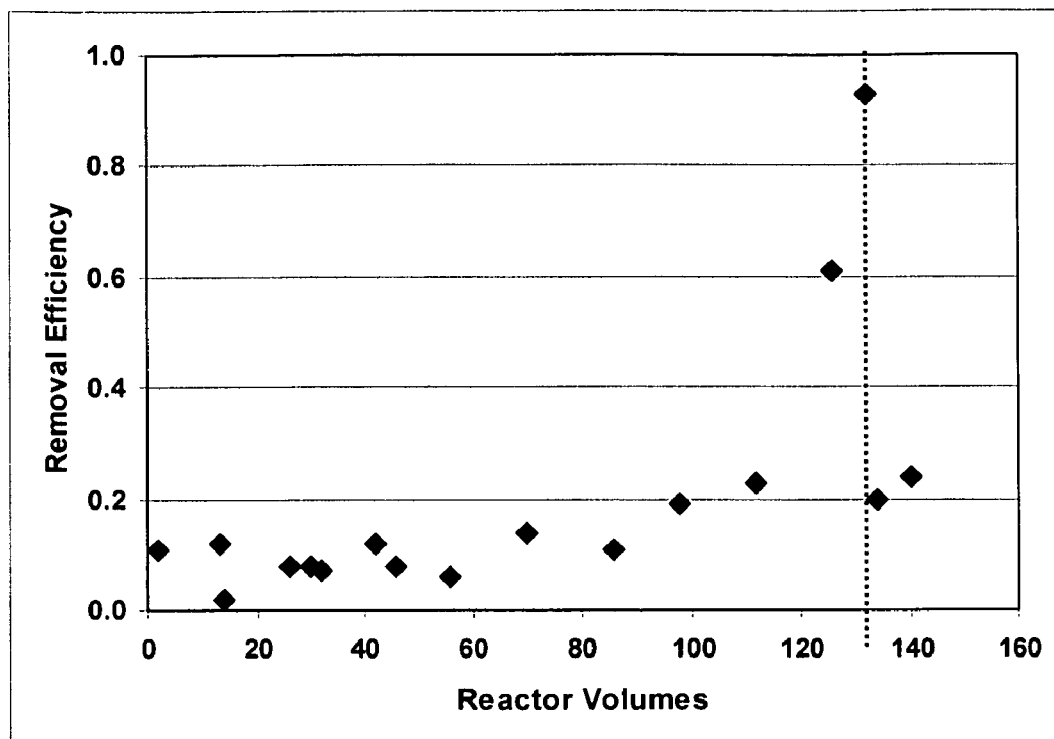
FIG. 8 is a graph illustrating long-term reactor performance and catalyst regeneration testing using dilute acid as described in Example 4.

FIG. 8 illustrates long-term reactor performance and catalyst regeneration testing using dilute sulfuric (0.1%) acid. The influent stream consisted of approximately 60 mg/L of TCE in artificial groundwater. Approximately 3 grams of nickel alumina catalyst particles having an average particle size diameter of <60 µm in the presence of hydrogen added to the reactor. Tests were performed at ambient conditions.

Test results, as shown in FIG. 8, show that the nickel catalyst particles did not become deactivated until over 100 reactor volumes and about 14 grams of TCE had been treated. Catalyst activity was subsequently regenerated after treatment with one reactor volume of dilute sulfuric (0.1%) acid. This test illustrates that the sustained treatment of TCE and NDMA by the nickel catalyst particles can be achieved, and catalyst regeneration using dilute acid is effective.

Example 5

Figure 9:
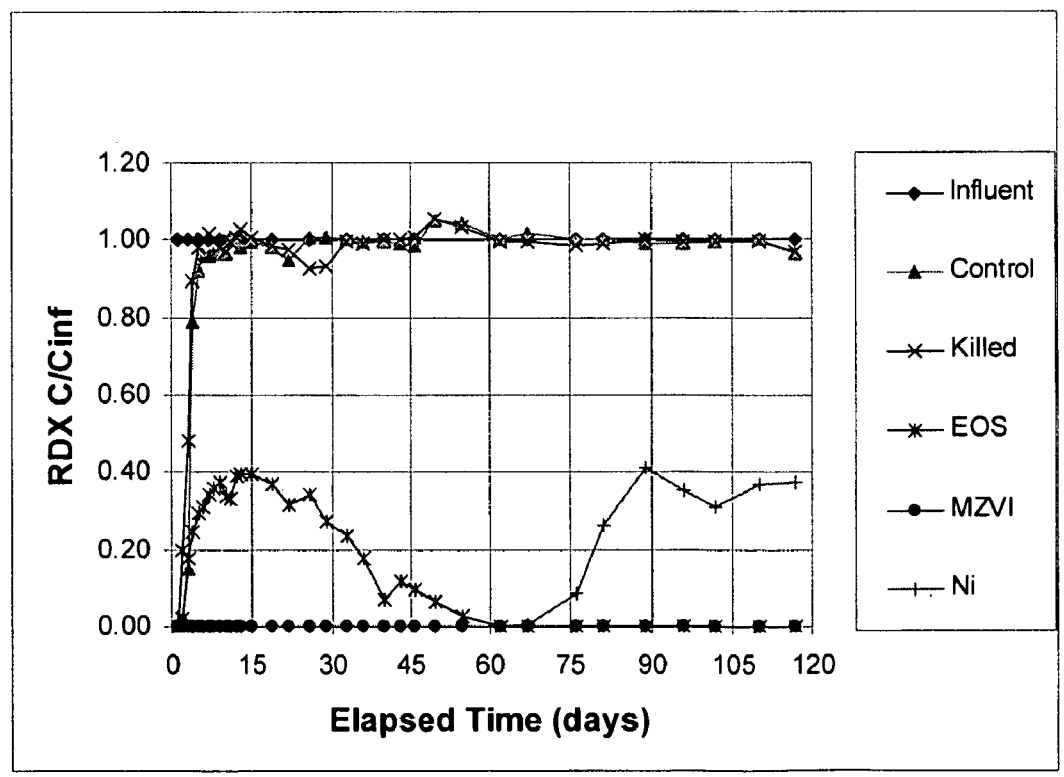
FIG. 9 is a graph of the results of a column experiment for treatment of RDX with nickel catalyst particles in a simulated in situ environment according to Example 5.

Tests were conducted simulating an in situ environment in a column containing soil and contaminated groundwater. The column was prepared by adding a mixture of soil and nickel catalyst particles 0.6% by weight in the columns having an average particle size of <60 μm to the column. Artificial groundwater contaminated with 5 ppm of RDX and containing nitrate was then pumped into the column. The experiment was conducted at ambient conditions, with a column residence time of approximately 24 hours, and continued for a period of approximately 118 days. As shown in FIG. 9, RDX was completely degraded through 60 days. The slow increase in RDX concentration shown after 60 days was postulated to be due to a depletion of hydrogen.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method for the in situ treatment of a contaminated medium comprising the steps of:
   introducing hydrogen into the contaminated medium;
   adding uncontained and unaffixed micron-sized metal catalyst particles to the contaminated medium;
   reacting the contaminated medium with the uncontained and unaffixed catalyst particles; and
   substantially retaining the uncontained and unaffixed catalyst particles in the contaminated medium by natural filtration of the particles through the contaminated medium.

2. The method of claim 1 wherein the step of adding the catalyst particles to the contaminated medium comprises adding Group VIII metal catalyst particles to the contaminated medium.

3. The method of claim 1 wherein the step of adding the catalyst particles to the contaminated medium comprises adding nickel metal catalyst particles to the contaminated medium.

4. The method of claim 1 wherein the step of adding the catalyst particles to the contaminated medium comprises adding nickel alumina metal catalyst particles to the contaminated medium.

5. The method of claim 1 wherein the step of adding the catalyst particles to the contaminated medium comprises adding catalyst particles having an average nominal diameter in the range of about 100 μm to about 0.01 μm.

6. The method of claim 1 wherein the step of adding the catalyst particles to the contaminated medium comprises adding catalyst particles having an average diameter in the range of about 0.1 μm to about 10 μm.

7. The method of claim 1 wherein the step of adding the catalyst particles to the contaminated medium comprises adding catalyst particles having an average diameter of about 1 μm.

8. The method of claim 1 wherein the steps of introducing hydrogen into the contaminated medium and adding micron-sized metal catalyst particles to the contaminated medium comprise introducing hydrogen and adding micron-sized metal catalyst particles, respectively, to a contaminated medium that is selected from the group consisting of soil, groundwater, leachate and wash-down water.

9. The method of claim 1 wherein the steps of introducing hydrogen into the contaminated medium and adding micron-sized metal catalyst particles to the contaminated medium comprise introducing hydrogen and adding micron-sized metal catalyst particles, respectively, to a contaminated medium that comprises at least one contaminant selected from the group consisting of chlorinated ethenes or ethanes, n-nitrosodimethylamine, (NDMA), nitrates, trinitrotoluene (TNT), dinitrotoluenes (DNT), glycerol trinitrate (nitroglycerin), 2,4,6-trinitrophenylmethylnitramine (tetryl), heavy metals, perchlorate and cyclotrimethylenetrinitramine (RDX).

10. The method of claim 1 further comprising the step of flushing the catalyst particles with an acid to promote catalyst regeneration.

11. The method of claim 10 further comprising the steps of recovering and/or neutralizing the acid after the promotion of catalyst regeneration.

12. The method of claim 1 further comprising the step of adding an oxidant to the contaminated medium to promote catalyst regeneration.

13. The method of claim 1 further comprising the step of adding a cosolvent to the contaminated medium.

14. The method of claim 13 wherein the step of adding the cosolvent to the contaminated medium comprises adding a cosolvent selected from the group consisting of an alcohol and an acetonitrile.

15. The method of claim 1 further comprising the step of adding a surfactant to the contaminated medium.

16. The method of claim 1 further comprising the step of adding an anion to the contaminated medium.

17. The method of claim 16 wherein the step of adding the anion includes adding an anion selected from the group consisting of a chloride and a nitrate.

18. The method of claim 1 further comprising the step of adjusting the pH of the contaminated fluid to <7.

19. A method for ex situ treatment of contaminated fluid, said method comprising the steps of:
    introducing hydrogen into the contaminated fluid;
    intermingling the contaminated fluid with uncontained and unaffixed micron-sized metal catalyst particles in a vessel; and
    substantially preventing the uncontained and unaffixed catalyst particles from eluting from the vessel with a membrane filter coupled to the vessel.

20. The method of claim 19 wherein the intermingling step is performed using Group VIII metal catalyst particles.

21. The method of claim 19 wherein the intermingling step is performed using nickel metal catalyst particles.

22. The method of claim 19 wherein the intermingling step is performed using nickel alumina metal catalyst particles.

23. The method of claim 19 wherein the intermingling step is performed using metal catalyst particles having an average nominal diameter in the range of about 100 μm to about 0.01 μm.

24. The method of claim 19 wherein the intermingling step is performed using metal catalyst particles having an average nominal diameter in the range of about 0.1 μm to about 10 μm.

25. The method of claim 19 wherein the intermingling step is performed using metal catalyst particles having an average nominal diameter of about 1 μm.

26. The method of claim 19 wherein the steps of introducing hydrogen into the contaminated medium and adding micron-sized metal catalyst particles to the contaminated medium comprise introducing hydrogen and adding micron-sized metal catalyst particles, respectively, to a fluid that is selected from the group consisting of groundwater, leachate and wash down-water.

27. The method of claim 19 wherein the steps of introducing hydrogen into the contaminated medium and adding micron-sized metal catalyst particles to the contaminated medium comprise introducing hydrogen and adding micron-sized metal catalyst particles, respectively, to a contaminated fluid that comprises at least one contaminant selected from the group consisting of chlorinated ethenes and ethanes, n-nitrosodimethylamine, (NDMA), nitrates, trinitrotoluene (TNT), dinitrotoluenes (DNT), glycerol trinitrate (nitroglycerin), 2,4,6-trinitrophenylmethylnitramine (tetryl), heavy metals, perchlorate and cyclotrimethylenetrinitramine (RDX).

28. The method of claim 19 wherein the intermingling step is performed in a batch reactor.

29. The method of claim 19 wherein the intermingling step is performed in a continuous reactor.

30. The method of claim 19 the step of introducing hydrogen is performed upstream of the vessel by a membrane system.

31. The method of claim 19 wherein the step of introducing hydrogen is performed via diffusion through pressurized silicone tubing positioned inside the vessel.

32. The method of claim 19 further comprising the step of flushing the catalyst particles with an acid to promote catalyst regeneration.

33. The method of claim 32 further comprising the steps of recovering and neutralizing the acid after the promotion of catalyst regeneration.

34. The method of claim 19 further comprising the step of adding an oxidant to the contaminated fluid to promote catalyst regeneration.

35. The method of claim 19 further comprising the step of adding a cosolvent to the contaminated fluid.

36. The method of claim 35 wherein the step of adding the cosolvent to the contaminated medium comprises adding a cosolvent selected from the group consisting of an alcohol and an acetonitrile.

37. The method of claim 19 further comprising the step of adding a surfactant to the contaminated fluid.

38. The method of claim 19 further comprising the step of adding an anion to the contaminated fluid.

39. The method of claim 38 wherein the step of adding the anion includes adding an anion selected from the group consisting of a chloride and a nitrate.

40. The method of claim 19 further comprising the step of adjusting the pH of the contaminated fluid to <7.

41. The method of claim 19 further comprising the step of pre-filtering the contaminated fluid prior to the contaminated fluid entering the vessel.

42. A system for the ex situ treatment of contaminated fluid, said system comprising:
a vessel configured to receive and adapted to contain the contaminated fluid and micron-sized metal catalyst particles;
a hydrogen source positioned for delivering hydrogen to the contaminated fluid received in the vessel, said hydrogen source comprising pressurized tubing positioned at least partially within said vessel; and
a membrane filter coupled to the vessel and positioned to substantially prevent the metal catalyst from eluting from said vessel.

43. The system of claim 40 further comprising a monitor positioned to measure concentrations of contaminants in fluid exiting said vessel.

44. A system for the ex situ treatment of contaminated fluid, said system comprising:
a vessel configured to receive and adapted to contain the contaminated fluid and micron-sized metal catalyst particles;
a hydrogen source positioned for delivering hydrogen to the contaminated fluid received in the vessel, said hydrogen source comprising an external membrane system located upstream of said vessel; and
a membrane filter coupled to the vessel and positioned to substantially prevent the metal catalyst from eluting from said vessel.

45. The system of claim 40 further comprising the metal catalyst particles, wherein said metal catalyst particles are a Group VIII metal.

46. The system of claim 40 further comprising the metal catalyst particles, wherein said metal catalyst particles are nickel.

47. The system of claim 40 further comprising the metal catalyst particles, wherein said metal catalyst particles are nickel alumina.

48. The system of claim 40 wherein said membrane filter is configured to substantially prevent catalyst particles having an average nominal diameter in the range of about 100 µm to about 0.01 µm from eluting from said vessel.

49. The system of claim 40 wherein said membrane filter is configured to substantially prevent catalyst particles having an average diameter in the range of about 0.1 µm to about 10 µm.

50. The system of claim 40 wherein said membrane filter is configured to substantially prevent catalyst particles having an average nominal diameter of about 1 µm.

51. The system of claim 40 wherein said vessel is configured to receive contaminated fluid selected from the group consisting of groundwater, leachate, wash down water and other aqueous streams.

52. The system of claim 40 wherein said vessel is configured to receive contaminated fluid comprising at least one contaminant selected from the group consisting of chlorinated ethenes and ethanes, n-nitrosodimethylamine, (NDMA), nitrates, trinitrotoluene (TNT), dinitrotoluenes (DNT), glycerol trinitrate (nitroglycerin), 2,4,6-trinitrophenylmethylnitramine (tetryl), heavy metals, perchlorate and cyclotrimethylenetrinitramine (RDX).

53. The system of claim 40 further comprising a catalyst regeneration system comprising an acid or an oxidant feed.

54. The system of claim 51 further comprising a neutralization tank configured to collect and/or neutralize the acid after the catalyst particles have been at least partially regenerated.

55. The system of claim 40 further comprising a cosolvent source configured to add a cosolvent to the contaminated fluid.

56. The system of claim 53 wherein the cosolvent source is configured to add cosolvent selected from the group consisting of an alcohol and an acetonitrile.

57. The system of claim 40 further comprising a surfactant source configured to add a surfactant to the contaminated fluid.

58. The system of claim 40 further comprising an anion source configured to add an anion to the contaminated fluid.

59. The system of claim 56 wherein the anion source is configured to add an anion selected from the group consisting of a chloride and a nitrate.

60. The system of claim 40 further comprising means for adjusting the pH of the fluid to <7.

61. The system of claim 40 further comprising a pre-filter positioned to remove entrained solids upstream of said vessel.

\* \* \* \* \*